Oct. 25, 1955  J. H. PICKREN  2,721,342
ILLUMINATED FLOAT
Filed March 15, 1952  2 Sheets-Sheet 1
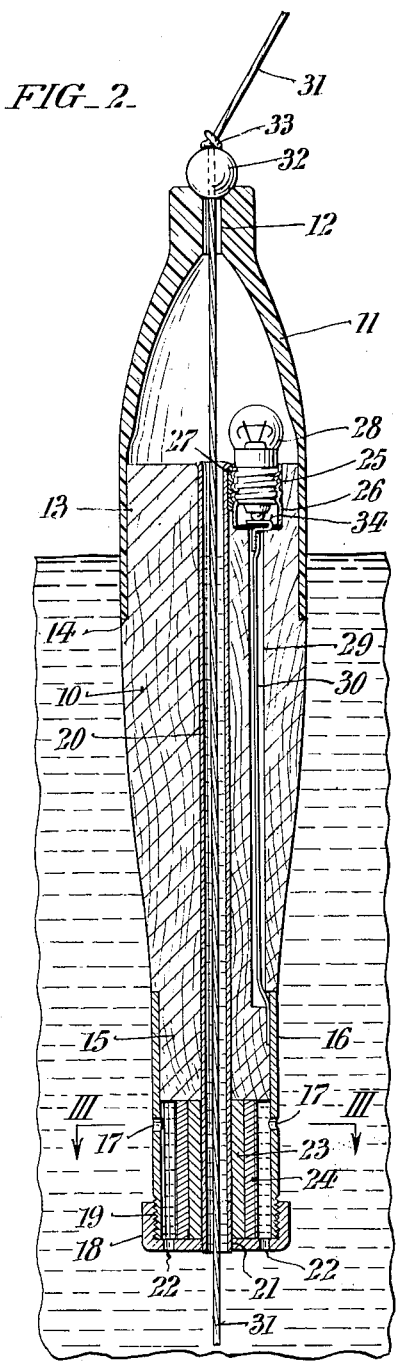
FIG_2_
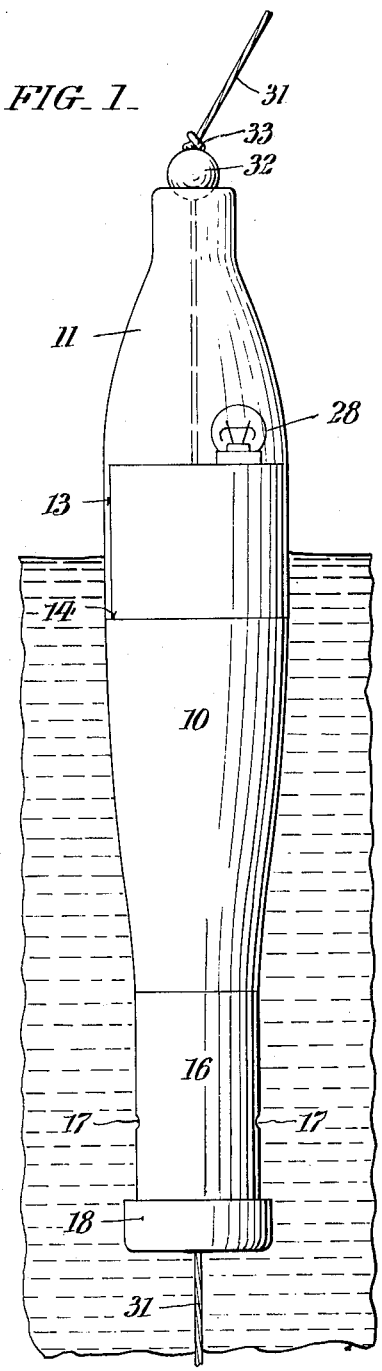
FIG_1_
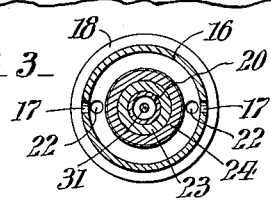
FIG_3_
INVENTOR:
James H. Pickren,
BY Paul & Paul
ATTORNEYS.

Oct. 25, 1955   J. H. PICKREN   2,721,342
ILLUMINATED FLOAT
Filed March 15, 1952   2 Sheets-Sheet 2
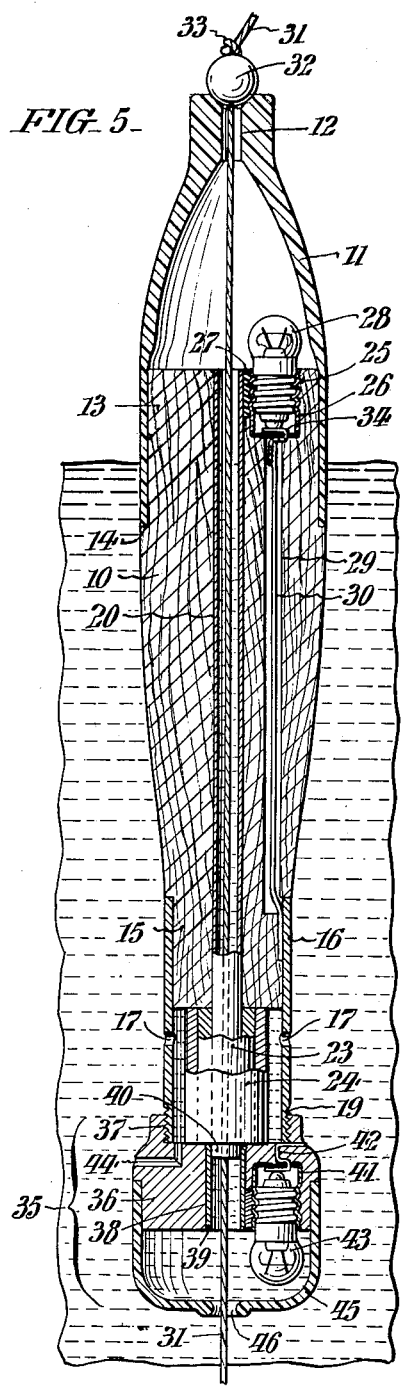
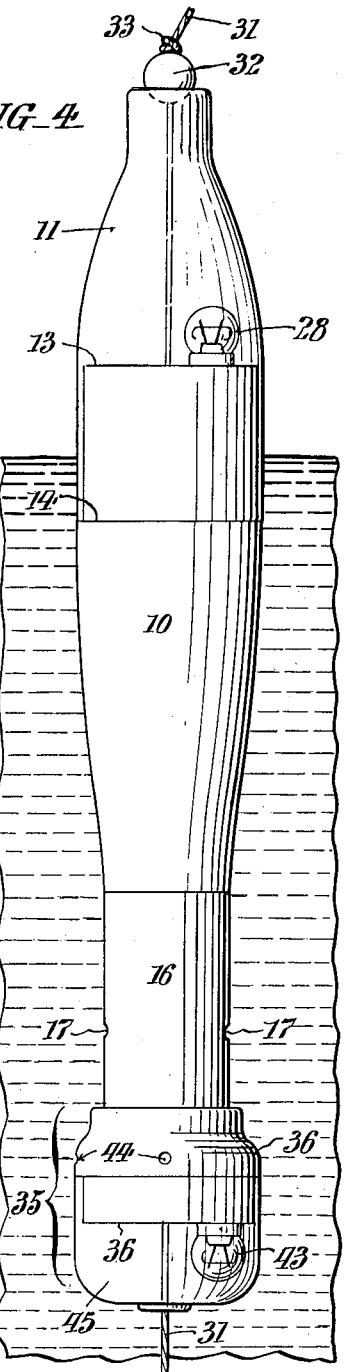
INVENTOR.
James H. Pickren,
BY Paul & Paul
ATTORNEYS.

United States Patent Office 2,721,342
Patented Oct. 25, 1955

2,721,342

ILLUMINATED FLOAT

James H. Pickren, Jacksonville, Fla.

Application March 15, 1952, Serial No. 276,884

13 Claims. (Cl. 9—8.3)

This invention relates to improvements in illuminated floats and particularly to a float which will automatically be illuminated on immersion in sea water or other water containing salts in solution.

The principal object of the present invention is to provide a device which will operate as a partially submerged float and at the same time be automatically illuminated for a substantial time period while immersed.

Further objects and advantages of the invention will appear from the drawings and description which follows.

In the drawings:

Fig. 1 is an elevation view showing one embodiment of the invention immersed and in operative position.

Fig. 2 is an axial section showing the internal construction of the device of Fig. 1.

Fig. 3 is a cross section taken as indicated by the lines III—III on Fig. 2.

Fig. 4 is an elevation view showing an alternative form of the invention in which both ends of the float are illuminated on immersion.

Fig. 5 is an axial section showing the internal construction of the device of Fig. 4.

The device shown in Figs. 1, 2 and 3 constitutes a specific form of the present invention directed particularly to an illuminated float for a fishing line or the like. The central part of the float consists of a body 10 made of a buoyant material such as wood or cork and having a central open passage extending through the body 10 from end to end. Attached to the upper end of the body 10 is a hollow cap 11 having an opening 12 at its upper end. Cap 11 may be made of any suitable transparent or translucent material and fits over the mounting portion 13 of body 10 which is of smaller diameter than the main body and therefore provides a support for cap 11 in the form of a circumferential ledge 14. A second narrowed mounting portion 15 is provided at the lower end of body 10 over which is fitted a metallic tube electrode 16 made of zinc, aluminum or magnesium and having openings 17 in the wall portion located beyond the end of portion 15. A cap 18 having a central opening 21 and outer openings 22 is fitted over the lower end of tubular member 16 either by a press fit or by screw threads 19 as shown in Fig. 2. Within the central open passage of body 10 there is fitted a metallic tube 20 which may be of copper, brass, iron, silver or nickel. The lower end of tube 20 passes through the space lying within the lower end of metallic tube 16 and thus provides a support for positive electrode 23 which is in the form of a removable cylinder having a central passage and may be made of carbon, copper, silver, platinum or gold. On the outer surface of electrode 23 there is provided a coating 24 which serves as a neutralizer during the operative periods of the device. Coating 24 is firmly affixed to electrode 23 and may consist of silver sulfate, silver chloride, cuprous chloride, copper sulfate, iodine, selenium peroxide, selenium sulfur oxide or selenium metal ground with silver sulfate. As a final protective coating for the neutralizer there may be provided a thin coating of plaster of Paris or a thimble of alundum or porous clay. This protective covering is helpful in preventing the dislodging of the neutralizer coating and in addition appears to provide a more effective and longer electrical action.

At the upper end of body 10 there is provided a pocket 25 within which socket 26 is mounted. Pocket 25 is positioned so that socket 26 is sufficiently close to the wall of tube 20 to permit soldering of the socket to the tube as shown at 27. A lamp 28 is fitted into socket 26 and may be of the low voltage and low current type as for instance 1.35 volts and 0.1 ampere or alternatively a lamp of 2 volts or 1.35 volts and .06 ampere. A passage 29 of relatively small diameter is formed in body 10 as shown in Fig. 2 which extends to the upper end of metallic tube 16. This provides an internal path for connecting wire 30 which is attached to the contact element 34 of socket 25 and to metallic tube 16 thus electrically connecting these elements.

In Figs. 4 and 5 an alternative form of the invention is shown characterized by the provision of means whereby the device may be converted to a float having illumination at both ends when immersed. This is accomplished by means of the removable illuminating attachment or element shown generally as 35 in Figs. 4 and 5. Attachment 35 consists of a support or body 36 which may be formed of wood or of a molded plastic material. Threads 37 are provided for engagement with corresponding threads at the end of tube 16. A central passage 38 is provided in support or body 36 and hollow metallic conductor or tube 39, preferably of copper, is press fitted into passage 38 as shown in Fig. 5. The inner diameter of tube 39 is such as to fit snugly over the protruding end 40 of tube 20 so that electrical contact is maintained when support 36 is screwed into engagement with metallic tube 16. Socket 41 is mounted in a cavity formed in support 36 and is soldered to copper tube 39. Electrical connection runs from tube 16 to contact element 42 of socket 41 and thence to lamp 43 which is mounted in socket 41 and is illuminated on immersion of the float in sea water or the like in the same way as lamp 28. In addition to providing underwater illumination the weight provided by attachment 35 aids in maintaining the float in the desired position. Passages 44 are provided in support 36 to insure circulation of water through the cavity formed by tube 16. A cap 45 is fitted over the end of support 36 and may consist of any suitable transparent or translucent material as in the case of cap 11. Opening 46 in cap 45 makes it possible to run a line 31 or other holding means through the entire float. It should be particularly noted that attachment 35 is designed and constructed so that it can be screwed on to the end of tube 16 in place of the cap 18 without disturbing or changing the other structural elements of the float shown in Figs. 1 and 2. Since these elements are the same they have been given like reference numbers in the drawings.

Various metals and chemical materials have been referred to in the above description. All of these are satisfactory under conditions of actual operation but I have discovered that the use of selenium, selenium peroxide or selenium sulfur oxide as the neutralizer or as a part thereof provides outstanding operation from point of view of current produced and total time of useful operation. A combination providing surprisingly good results consists of selenium metal and silver sulfate ground together in the proportion of about 3 parts selenium to 1 part silver sulfate by weight. The relative amounts may be varied in the range of 5 parts selenium to 1 part silver sulphate to 1 part selenium to 3 parts silver sulfate but about 3 to 1 is best in the combination using carbon as the positive electrode and zinc as the negative electrode. This provides a preferred combination and gives, on immersion in sea water or the like, a voltage of about 1.7 and current of about 0.1 ampere. This is ample for operation of the lamps referred to above and continuous immersion provides continuous illumination for periods of 8 to 10 hours or more.

While the preferred form of the invention includes the use of selenium metal ground with silver sulfate, it is possible to use selenium peroxide or a mixture of selenium peroxide and silver sulfate as the neutralizer. Likewise selenium sulfur oxide or a mixture of selenium sulfur oxide and silver sulfate may be used as neutralizers. The range of relative amounts of these ingredients may be the same as in the case of selenium metal and silver sulfate.

The illumination of lamp 28 on immersion of the float in sea water is brought about by the difference in potential existing between zinc tube 16 and carbon cylinder 23. One end of the filament of lamp 28 is connected to tube 16 by the wire 30 and the other end of the filament is connected to carbon cylinder 23 by copper tube 20 thus completing the circuit. Hydrogen evolved at the surface of cylinder 23 and plated zinc on 23 from tube 16 is continuously neutralized by the neutralizer. Ultimately this neutralizing action decreases and this results in a lowered voltage and current. When this occurs the cylinder 23 is removed and a replacement unit is inserted in its place. This operation is very easily carried out since the cylinder 23 is readily accessible by removing cap 18 of the combination shown in Fig. 2 or by removing attachment 35 of the combination shown in Fig. 5. The unit which has been removed can then be cleaned and recoated with neutralizer material for re-use. Since no action takes place in normal storage it is thus possible to maintain a stock of coated cylinders for replacement as needed.

The particular form of the invention shown in the drawings is intended to serve as an illustration of two specific preferred embodiments but is not intended as a limitation on the scope of the invention or of the appended claims. It will be apparent that various modifications involving the substitution of equivalent structures may be made within the scope of the invention as defined in the claims. The particular illuminated float shown may be used to great advantage in marking the location of an object to which the lower end of line 31 is attached. The nature of the object to which the line is attached may vary but in all cases it is possible, by virtue of the open passage from one end of the float to the other, to take advantage of the fact that the line 31 runs freely through the float and this makes possible reeling in of the attached object without creating a problem as to what to do with the float. The advantage of this construction in the case of submerged objects, such as lobster pots and fish traps will be apparent. Likewise, in the case of using the illuminated float of the present invention in night-time fishing operations, it is apparent that there is a great advantage in having line 31 run freely through the float. In operations of this sort the bead 32 is held to a fixed position on the line by the knot 33 and this results in a fixed length of submerged line. The embodiment of the invention shown in Figs. 4 and 5 has the further advantage in night-time fishing of providing underwater illumination which in some cases serves to attract the fish to the general vicinity of the submerged line. Various other uses will be apparent to those familiar with the problems involved in identifying the location of objects in the ocean at night. For example, the float could be used, in the case of emergency, to show the location of a person in need of assistance or rescue. The device may also be used as a marker buoy simply by attaching the lower end of line 31 to the usual fixed position buoy or by attaching the lower end of the line to an object which is anchored in the desired position. In all such cases the simplicity of construction and operation, and the automatic nature thereof are of great advantage. Likewise, the easy replaceability of the positive electrode in both forms of the invention as shown, makes the device one which may be used efficiently in a practical way since the expense of replacing the positive electrode is relatively minor and there is no need of discarding the more expensive supporting structure.

Having thus described my invention, I claim:

1. An illuminating float for use in seat water or the like comprising a body of buoyant material, a passage open at both ends extending through the body, a hollow metallic conductor positioned in the passage, a removable electrode mounted on the hollow metallic conductor in electrical contact therewith, a second electrode affixed to the body and in spaced relationship to the removable electrode, a neutralizer disposed on the surface of the removable electrode, a lamp and conducting elements electrically connecting the second electrode to the hollow metallic conductor, and a hollow cap affixed to the top of the body and enclosing the lamp; the hollow metallic conductor and the hollow cap forming a free passageway through the entire device.

2. The invention of claim 1 further characterized by a removable illuminating element affixed to the lower end of said body, said element comprising a body, a central passage through said body, a second hollow metallic conductor mounted in said passage and positioned in electrical contact with the first hollow metallic conductor, a lamp and electrical conducting elements connecting said lamp to said second hollow metal conductor and to the electrode affixed to the body.

3. The invention of claim 1 in which the hollow cap affixed to the top of the body and enclosing the lamp is made of a transparent material.

4. The invention of claim 1 further characterized by the fact that the neutralizer is cylindrical and concentric with the cylindrical removable electrode and affixed to the outer surface thereof so that both cylinders are removable as a unit, said neutralizer being made of a mixture containing a material selected from the group consisting of selenium, selenium and silver sulfate, selenium peroxide and selenium sulfur oxide.

5. The invention of claim 1 further characterized by the fact that said removable electrode is cylindrical.

6. The invention of claim 1 in which the removable electrode is made of a material selected from the group consisting of carbon, copper, silver, platinum or gold.

7. The invention of claim 1 in which the metal electrode affixed to the body is made of a material selected from the group consisting of zinc and aluminum and magnesium.

8. The invention of claim 1 further characterized by openings in the side walls of the second electrode.

9. The invention of claim 1 further characterized by a removable cap affixed to the end of the second electrode.

10. The invention of claim 1 in which the hollow metallic conductor is made of a material selected from the group consisting of copper, brass, iron, silver or nickel.

11. The invention of claim 1 further characterized by an element affixed to the end of the illuminated float, said element consisting of a body, a passage extending through the body, a metallic tube mounted in the passage, a lamp mounted in said body, and a conductor connecting the lamp and the metallic tube.

12. The invention of claim 11 further characterized by a transparent cap enclosing said lamp.

13. In an illuminating float for use in sea water or the like the mechanism comprising a buoyant body, a hollow electrode affixed around that body, a second hollow electrode positioned within the hollow of the first electrode in spaced relationship thereto, a neutralizer disposed on the surface of the second electrode protecting the surface thereof, a hollow electrical conductor making electrical contact with substantially the entire interior of the second electrode, an end cap fitting around the exterior of the hollow electrical conductor and the first electrode, the end cap and first electrode having apertures therein permitting flow of a liquid between the electrodes.

References Cited in the file of this patent

UNITED STATES PATENTS

| 340,474 | Armstrong | Apr. 20, 1886 |
| 759,740 | Noble et al. | May 10, 1904 |
| 1,289,366 | Benner et al. | Dec. 31, 1918 |
| 1,522,121 | Harrison | Jan. 6, 1925 |
| 2,099,506 | Winckler | Nov. 16, 1937 |
| 2,099,878 | Winckler | Nov. 23, 1937 |
| 2,109,813 | Winckler | Mar. 1, 1938 |
| 2,120,618 | Martus et al. | June 14, 1938 |
| 2,446,459 | Digmon | Aug. 3, 1948 |
| 2,534,709 | Goertzen | Dec. 19, 1950 |